3,777,027
ANORECTIC COMPOSITIONS COMPRISING N-PYRIDYLALKYL - β - ALKOXY-β-TRIFLUORO-METHYLPHENALKYLAMINES
Stephen T. Ross and Charles L. Zirkle, Berwyn, Pa., assignors to Smithkline Corporation, Philadelphia, Pa.
No Drawing. Original application Sept. 15, 1970, Ser. No. 72,536, now Patent No. 3,679,693. Divided and this application May 8, 1972, Ser. No. 251,528
Int. Cl. A61k 27/00
U.S. Cl. 424—263          11 Claims

ABSTRACT OF THE DISCLOSURE

Pharmaceutical compositions having anorectic activity comprising N-pyridylalkyl-β-alkoxy-β-trifluoromethylphenalkylamines. The active medicaments are prepared by the condensation of an N-pyridylalkylamine with a β-alkoxy-trifluoromethylphenalkyl halide.

---

This is a division of application Ser. No. 72,536, filed Sept. 15, 1970, now U.S. Pat. No. 3,679,693

This invention relates to novel N-pyridylalkyl-β-alkoxy-trifluoromethylphenalkylamines which have useful pharmacodynamic activity. More specifically, these compounds have utility as anorectic agents, that is, they produce a significant decrease in body weight gain accompanied by anorexia with little or no side effects.

The compounds of this invention may be represented by the following structural formula:

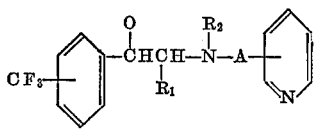

Formula I in which
A represents lower alkyl of from 1 to 3 carbon atoms, preferably methyl;
$R_1$ represents hydrogen or methyl;
$R_2$ represents hydrogen or lower alkyl of from 1 to 3 carbon atoms; and
A represents a lower alkylene chain, straight or branched, of from 1 to 3 carbon atoms.

Preferred compounds of this invention are represented by the following structural formula:

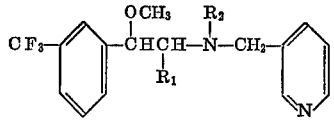

Formula II in which $R_1$ and $R_2$ are each hydrogen or methyl.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bismethylenesalicylic, methanesulfonic, ethanedisulfonic, acetic, oxalic, propionic, tartaric, salicylic, citric, gluconic, lactic, malic, mandelic, cinnamic, citraconic, aspartic, stearic, palmitic, itaconic, glycolic, p-aminobenzoic, glutamic, benzenesulfonic, hydrochloric, hydrobromic, sulfuric, cyclohexylsulfamic, phosphoric and nitric acids.

A convenient method for the preparation of the compounds of this invention is illustrated by the following reaction:

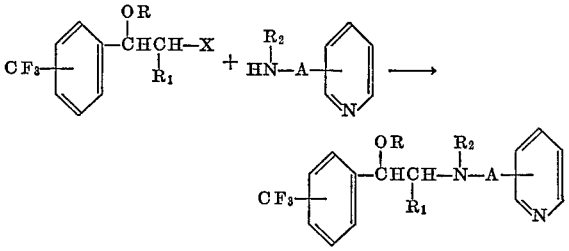

in which R, $R_1$, $R_2$ and A are as defined above for Formula I and X is halogen. Thus, when $R_2$ is lower alkyl, a trifluoromethyl substituted β-alkoxyphenalkyl halide, preferably bromide, is condensed with an N-alkyl-N pyridylalkylamine in a nonreactive organic solvent such as benzene, toluene or xylene, in the presence of an alkali metal carbonate, for example potassium carbonate, at reflux temperature for from 4 to 12 hours. When $R_2$ is hydrogen, the phenalkyl halide is advantageously condensed with an excess of the N-pyridylalkylamine at about 80° to 120° C. for from 1 to 3 hours.

Racemic mixtures of the compounds of this invention are obtained by this method of preparation as a result of the asymmetric substitution of one or more carbon atoms. Such mixtures can be resolved by fractional crystallization of an optically active salt of the amine product. Unless otherwise stated herein it is intended to include in the structural formulas and in the claims, both the racemic mixtures as well as the separated $d$ and $l$ isomers.

The preparation of the appropriately substituted β-alkoxyphenalkyl halides used as starting materials herein is described in U.S. Pat. Nos. 3,226,440 and 3,459,803.

The anorectic activity of the compounds of this invention is demonstrated by a standard pharmacological procedure as follows. Compounds are tested orally for their ability to quantitatively reduce first hour food consumption of rats trained to consume their daily food requirements in only six hours. A preferred compound of this invention, N-(3'-pyridylmethyl)-β-methoxy-β-(3-trifluoromethylphenyl)-ethylamine, has an oral anorectic $ED_{50}$ in rats of 4.4 mg./kg.

To obtain anorectic activity the compounds of this invention are advantageously administered orally or parenterally to an animal organism in conventional dosage unit forms. Preferably a compound or an acid addition salt thereof is administered orally in a tablet or capsule. The dosage units are prepared by incorporating the active medicament in an amount sufficient to produce anoretic activity with a nontoxic pharmaceutical carrier according to accepted procedures. Preferably each dosage unit will contain the active medicament in an amount of about 10 mg. to about 100 mg. Advantageously equal doses will be administered two to four times daily with the daily dosage regimen being about 20 mg. to about 400 mg.

The pharmaceutical carrier employed may be, for example, either a solid or liquid. Exemplary of solid carriers are lactose, terra alba, sucrose, talc, gelatin, agar, pectin, acacia, magnesium stearate, stearic acid and the like.

Exemplary of liquid carriers are syrup, peanut oil, olive oil, water and the like. Similarly the carrier or diluent can include any time delay material well known to the art, such as glyceryl monstearate or glyceryl distearate alone or with a wax.

A wide variety of pharmaceutical forms can be employed. Thus, if a solid carrier is used the preparation can be tableted, placed in a hard gelatin capsule in powder or pellet form, or in the form of a troche or lozenge. The amount of solid carrier will vary widely but preferably will be about 25 mg. to about 1 g. If a liquid carrier is used, the preparation will be in the form of a syrup, emulsion, soft gelatin capsule, sterile injectable liquid such as an ampule, or an aqueous or nonaqueous liquid suspension.

The following examples illustrate more specifically how to prepare compounds of this invention. However, as such, they are not to be construed as limiting the scope of the invention as defined in Formulas I and II above.

EXAMPLE 1

A mixture of 51.0 g. (0.180 m.) of β-methoxy-β-(3-trifluoromethylphenyl)-ethyl bromide and 58.4 g. (0.540 m.) of 3-aminomethylpyridine is stirred and heated to 80° C. under nitrogen for two hours. The cooled reaction mixture is diluted with water, excess hydrochloric acid is added and the mixture is extracted with ether. The aqueous layer is made basic with concentrated ammonium hydroxide and reextracted with ether. The dried ether extract is concentrated and the residue vacuum distilled to give β - methoxy - β-(3-trifluoromethylphenyl)-N-(3'-pyridylmethyl)ethylamine, B.P. 137.5–153° C./0.10 mm.; hydrochloride, M.P. 156–159° C.

Similarly, reaction of 3-aminomethylpyridine with β-ethoxy - β-(3-trifluoromethylphenyl)-ethyl bromide as described above yields β - ethoxy-β-(3-trifluoromethylphenyl)-N-(3'-pyridylmethyl)ethylamine.

EXAMPLE 2

A mixture of 10.06 g. (0.0820 m.) of N1methyl-3-pyridylmethylamine, 38 ml. of xylene, 5.66 g. (0.0410 m.) of potassium carbonate and 23.20 g. (0.0820 m.) of β-methoxy - β - (3-trifluoromethylphenyl)-ethyl bromide is stirred at reflux (148° C.) for five and one-half hours. The cooled reaction mixture is filtered and the filtrate concentrated under reduced pressure. The residue is vacuum distilled to give β-methoxy-N-methyl-N-(3'-pyridylmethyl) - β-(3-trifluoromethylphenyl)-ethylamine, B.P. 118.5–148° C./0.05 mm.; hexamate, M.P. 115–118° C.

EXAMPLE 3

β-Methoxy-β-(3'- trifluoromethylphenyl)ethyl bromide (25.0 g., 0.0884 m.) and 28.6 g. (0.2652 m.) of 2-aminomethylpyridine are stirred and heated at 80° C. under nitrogen for one hour. The cooled reaction mixture is partitioned between water and ether, excess ammonium hydroxide is added and the aqueous phase is extracted with ether. The ether extract is concentrated to an oily residue which is vacuum distilled to yield β-methoxy-N-(2'-pyridylmethyl) - β-(3-trifluoromethylphenyl)-ethylamine, B.P. 117–126° C./0.10 mm.; hydrochloride, M.P. 132–136° C.

EXAMPLE 4

A mixture of 25.0 g. (0.0884 m.) of β-methoxy-β-(3-trifluoromethylphenyl)-ethyl bromide and 28.6 g. (0.2652 m.) of 4-aminomethylpyridine is stirred and heated at 80° C. under nitrogen for one hour. The cooled reaction mixture is partitioned between water and ether, excess ammonium hydroxide is added and the aqueous phase is extracted with ether. The ether extract is concentrated and the residual oil is partitioned between water and ether, excess ammonium hydroxide is added and the aqueous phase is extracted with ether. The ether extract is concentrated and the residual oil is vacuum distilled to give the free base, β-methoxy-N-(4'-pyridylmethyl)-β-(3-trifluoromethylphenyl)-ethylamine, B.P. 128–138° C./0.10 mm.; hydroxide, M.P. 224.5–228.5° C.

EXAMPLE 5

Following the procedure of Example 1, 3-aminomethylpyridine is reacted with O-methoxy-β-(2-trifluoromethylphenyl)-ethyl bromide to yield β-methoxy-β-(2-trifluoromethylphenyl)-N-(3'-pyridylmethyl)-ethylamine.

Similar reaction with β-methoxy-β-(4-trifluoromethylphenyl)-ethyl bromide gives β - methoxy-β-(4-trifluoromethylphenyl)-N-(3'-pyridylmethyl)-ethylamine.

EXAMPLE 6

Following the procedure of Example 1, 3-aminoethylpyridine is reacted with 1-methoxy-1-(3'-trifluoromethylphenyl) - 2-propyl bromide to give N-(3''-pyridylethyl)-1-methoxy-1-(3'-trifluoromethylphenyl)-2-propylamine.

EXAMPLE 7

Ingredients: Mg./tablet
β - methoxy - β-(3-trifluoromethylphenyl)-N-(3'-pyridylmethyl)-ethylamine _____ 25
Calcium sulfate, dihydrate _____ 65
Sucrose _____ 12
Starch _____ 7
Talc _____ 5
Stearic acid _____ 3

The sucrose, calcium sulfate and active medicament (as the hydrochloride) are thoroughly mixed and granulated with hot 10% gelatin solution. The wetted mass is passed through a #6 mesh screen directly onto drying trays. The granules are dried at 120° F. and passed through a #20 mesh screen, mixed with the starch, talc and stearic acid, and compressed into tablets.

EXAMPLE 8

Ingredients: Mg./capsule
β - methoxy - N-methyl-N-(3'-pyridylmethyl)-β-(3-trifluoromethylphenyl)-ethylamine _____ 50
Magnesium stearate _____ 5
Lactose _____ 325

The active medicament (as the hexamate) and other ingredients above are screened through a #40 mesh screen, mixed and filled into #0° hard gelatin capsules.

What is claimed is:

1. A pharmaceutical composition having anorectic activity, in dosage unit form, comprising an anorectically effective amount of a compound of the formula:

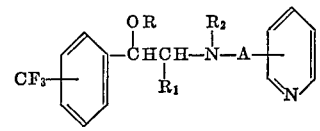

in which:

R is lower alkyl of from 1 to 3 carbon atoms;
$R_1$ is hydrogen or methyl;
$R_2$ is hydrogen or lower alkyl of from 1 to 3 carbon atoms; and
A is a lower alkylene chain, straight or branched, of from 1 to 3 carbon atoms,
or a pharmaceutically acceptable acid addition salt thereof, and a pharmaceutical carrier.

2. The composition of claim 1 in which the $CF_3$ group is in the meta position.
3. The composition of claim 2 in which the pyridine ring is 3-substituted.
4. The composition of claim 3 in which R is methyl.
5. The composition of claim 4 in which A is methylene.
6. The composition of claim 5 in which $R_1$ is hydrogen.
7. The composition of claim 6 in which $R_2$ is hydrogen.
8. The composition of claim 6 in which $R_2$ is methyl.
9. The composition of claim 1 in which the active medicament is in an amount of about 10 mg. to about 100 mg. per dosage unit.

10. The method of producing anorectic activity in an animal organism in need thereof which comprises administering orally or parenterally to said animal organism in an amount sufficient to produce said activity a compound as defined in claim 9.

11. The method of claim 10 in which the active medicament is administered in a daily dosage regimen of about 20 mg. to about 400 mg.

References Cited
UNITED STATES PATENTS
3,433,796   3/1969   Nauta _____ 260—296 AE ALBERT T. MEYERS, Primary Examiner
N. A. DREZIN, Assistant Examiner U.S. Cl. X.R.
424—266

PO-1050
(5/69)

UNITED STATES PATENT OFFICE
CERTIFICATE OF CORRECTION

Patent No. 3,777,027                    Dated December 4, 1973

Inventor(s) Stephen T. Ross and Charles L. Zirkle

It is certified that error appears in the above-identified patent and that said Letters Patent are hereby corrected as shown below:

Column 1, formula I, lines 30-35, should read as follows:

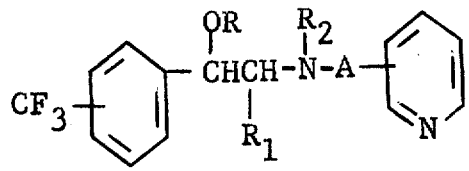

Column 1 line 40, should read as follows:

"R represents lower alkyl of from 1 to 3 carbon atoms,"

Column 5, claim 10, line 7, should read as follows:

"pound as defined in claim 1."

Signed and sealed this 23rd day of April 1974.

(SEAL)
Attest:

EDWARD M.FLETCHER,JR.                C. Marshall Dann
Attesting Officer                     Commissioner of Patents